United States Patent [19]
> Bräuer et al.

[11] Patent Number: 4,535,139
[45] Date of Patent: Aug. 13, 1985

[54] POLYMERS CONTAINING SULPHONYL AND CARBOXYLIC ESTER GROUPS

[75] Inventors: Wolfgang Bräuer; Siegfried Korte, both of Leverkusen; Theo Neukam, Dormagen; Carlhans Süling, Odenthal, all of Fed. Rep. of Germany

[73] Assignee: Bayer Aktiengesellschaft, Leverkusen, Fed. Rep. of Germany

[21] Appl. No.: 491,682

[22] Filed: May 5, 1983

[30] Foreign Application Priority Data

May 25, 1982 [DE] Fed. Rep. of Germany ....... 3219641

[51] Int. Cl.³ .............................................. C08F 228/02
[52] U.S. Cl. ................................ 526/287; 264/176 F; 526/240
[58] Field of Search ......................................... 526/287

[56] References Cited

U.S. PATENT DOCUMENTS

| | | | |
|---|---|---|---|
| 2,527,300 | 10/1950 | Dudley | 526/287 |
| 3,355,410 | 11/1967 | Dannelly | 526/287 |
| 3,380,976 | 4/1968 | Izumi | 526/287 |
| 3,505,290 | 4/1970 | Mazzolini | 526/287 |

FOREIGN PATENT DOCUMENTS 646248  8/1962  Canada .................. 526/287

Primary Examiner—Christopher A. Henderson
Attorney, Agent, or Firm—Sprung, Horn, Kramer & Woods

[57] ABSTRACT

Polymers obtained by radical polymerization and containing (A) from 0.1 to 80 mole percent of polymerized units corresponding to the following formula

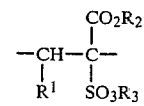

in which $R_1$ represents hydrogen or methyl, $R_2$ represents alkyl, particularly primary or secondary alkyl containing from 1 to 4 carbon atoms, and $R_3$ represents hydrogen or alkyl, particularly primary or secondary alkyl containing from 1 to 4 carbon atoms, and in which the sulphonic acid group may be present in the form of a salt, and (B) from 20 to 99.9 mole percent of polymerized units of one or more ethylenically unsaturated monomers, are particularly suitable for the production of filaments, fibres and films having a high absorption capacity for basic dyes.

4 Claims, No Drawings

POLYMERS CONTAINING SULPHONYL AND CARBOXYLIC ESTER GROUPS

This invention relates to polymers containing sulphonic acid, sulphonate and/or sulphonic acid ester groups and also carboxylic acid ester groups, to their production and use, and to acrylic and modacrylic fibres produced from these polymers.

It is already known (J. Macromol. Sci. Chem. A3, 1551 (1969), Z. Anal. Chem. 249, 1 (1970), Ang. Chem. 92, 215 (1980) that vinyl monomers containing two electronattracting groups on the same carbon atom (the groups in question being carboxylic acid ester or CN-groups) can be radically copolymerized.

By contrast, copolymers derived from monomers containing a strongly acidic and a mildly acidic group on the same carbon atom are not known because corresponding monomers are only available, if at all, in inadequate quantities.

The present invention relates to polymers containing (A) from 0.1 to 80 mole percent of polymerized units corresponding to the following formula

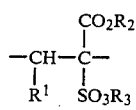

in which $R_1$ represents hydrogen or methyl, $R_2$ represents alkyl, particularly primary or secondary alkyl containing from 1 to 4 carbon atoms, and $R_3$ represents hydrogen or alkyl, particularly primary or secondary alkyl containing from 1 to 4 carbon atoms, and in which the sulphonic acid group may be present in the form of a salt, and (B) from 20 to 99.9 mole percent of polymerized units of one or more ethylenically unsaturated monomers.

$R_1$ is preferably hydrogen, $R_2$ is preferably methyl and $R_3$ is preferably hydrogen or methyl. If the sulphonic acid group is present in the form of a salt, the alkali metal, alkaline-earth metal, zinc, aluminium and ammonium salts are preferred.

Suitable comonomers of group B are, for example, ethylene, propylene, 1-butene, isobutylene, 4-methyl-1-pentene, styrene and styrene derivatives, butadiene, isoprene, dimethyl butadiene, chloroprene, vinyl acetate, vinyl pyrrolidone, vinyl carbazole, vinyl fluoride, vinyl chloride, vinylidene chloride, vinylidene fluoride, acrylates, acrylamides, acrylonitrile, methacrylonitrile, 2-cyanoacrylates, methyl methacrylate, 2-hydroxyethyl methacrylate, maleic acid anhydride, maleic acid imide and acrolein.

Preferred comonomer units of group B correspond to the following formula:

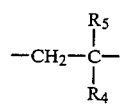

in which $R_4$ represents H, alkyl, halogen or CN, and $R_5$ represents H, alkyl, aryl, carboxylic acid ester, carboxylic acid amide, acyloxy, CN or halogen.

$R_4$ is preferably hydrogen, halogen or methyl and $R_5$ is preferably alkoxy carbonyl, aryl, CN, halogen and alkyl carbonyloxy, the alkoxy and alkyl groups preferably containing from 1 to 4 carbon atoms.

Acrylonitrile, acrylic acid-$C_1$-$C_4$-alkyl esters, methacrylic acid methyl ester, vinyl acetate and styrene are preferred.

Suitable monomers which give the units of group A are, for example, 2-sulphopropenoic acid methyl ester and 2-methoxysulphonyl propenoic acid methyl ester, the sulpho group optionally being present in the form of the alkali metal, alkaline-earth metal, zinc, magnesium, aluminium or ammonium salt. Mixtures of the compounds may also be used.

These monomers may be obtained by reacting $\alpha$-$\beta$-unsaturated carboxylic acid esters corresponding to the following general formula:

in which $R_1$ and $R_2$ are as defined above, with from 0.6 to 1.6 mole equivalents of sulphur trioxide and, optionally, with from 0.1 to 10 mole equivalents of an alkylating agent, based in each case on the unsaturated ester, at temperatures in the range of from $-10°$ to $+25°$ C., heating the reaction mixture to temperatures in the range of from 70° to 200° C., working up the reaction mixture by distillation and optionally separating the components of the distillate.

The reaction of the $\alpha$-$\beta$-unsaturated carboxylic acid esters is preferably carried out with from 0.8 to 1.2 mole equivalents of sulphur trioxide at 0° to $+10°$ C., from 0.2 to 5 mole equivalents of dimethyl sulphate optionally being added.

The preferred starting compound is methyl acrylate.

Preferred polymers contain from 40 to 99.9 mole percent of acrylonitrile, from 0.1 to 15 mole percent of 2-sulphopropenoic acid methyl ester, 2-methoxy-sulphonyl propenoic acid methyl ester or a mixture of both compounds and from 0 to 59.9 mole percent of one or more ethylenically unsaturated monomers.

The preferred polymers are, in particular, starting materials for the production of acrylic and modacrylic fibers having a high affinity for basic dyes.

Particularly advantageous polymers consist of
(a) from 89 to 99.9 mole percent of acrylonitrile and from 0.1 to 11 mole percent of 2-methoxysulphonyl propenoic acid methyl ester,
(b) from 92 to 99.9 mole percent of acrylonitrile and from 0.1 to 8 mole percent of 2-sulphopropenoic acid methyl ester,
(c) from 90 to 99.8 mole percent of acrylonitrile, from 0.1 to 6 mole percent of methyl acrylate and from 0.1 to 4 mole percent of 2-methoxy sulphonyl propenoic acid methyl ester,
(d) from 40 to 89.9 mole percent of acrylonitrile, from 0.1 to 15 mole percent of 2-sulphopropenoic acid methyl ester or 2-methoxy sulphonyl propenoic acid methyl ester and from 10 to 59.9 mole percent of vinyl chloride or vinylidene chloride.

The polymers have an average molecular weight $M_n$ of from $10^3$ to $10^7$.

The present invention also relates to a process for producing the polymers according to the invention which is characterized in that from 0.1 to 80 mole percent of compounds corresponding to the following formula:

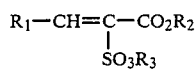

in which $R_1$, $R_2$ and $R_3$ are as defined above, are polymerized with from 99.9 to 20 mole percent of one or more ethylenically unsaturated monomers under radical polymerization conditions.

If the polymers contain sulphonate groups, the polymerization reaction may either be carried out with unsaturated sulphonates or alternatively the unsaturated sulphonic acids are incorporated in the polymer and salt formation is carried out on the polymer.

Polymerization may be carried out by any of the usual methods, such as mass polymerization, solution polymerization, suspension and precipitation polymerization in aqueous and non-aqueous media and also emulsion polymerization.

However, in protic solvents, such as water and alcohols, the stability of the sulphopropene compounds is reduced to such an extent that the levels of incorporation during the copolymerization reaction are lowered.

Polymerization may be carried out as a batch, semi-batch and continuous process.

Suitable reaction media are the monomers themselves, and protic and aprotic solvents. Suitable aprotic solvents are both apolar solvents, such as aliphatic and aromatic hydrocarbons, and also polar solvents, such as halogenated hydrocarbons, dimethyl formamide, dimethyl sulphoxide, dimethyl acetamide and acetonitrile. They may be used as solvents and as non-solvents both for the monomers and also for the polymers.

Solvents which are suitable for forming complexes with the monomers containing sulpho groups, such as dimethyl formamide, dimethyl sulphoxide and dimethyl acetamide, are capable of affecting copolymerization reactivity.

The polymerization reaction may be started with the usual initiators such as, for example, azo compounds, peroxides, peresters, percarbonates and the redox systems which are active at lower temperatures.

Examples of starters such as these are 2,2'-azo-bis-isobutyronitrile, dilauryl peroxide, benzoyl peroxide, diisopropyl percarbonate, t-butyl hydroperoxide/$SO_2$ and potassium peroxodisulphate/sodium disulphite.

The reaction temperature and the reaction time are determined by the monomers, the solvents, the initiators and by the method used for polymerization.

Where acrylonitrile is used as the ethylenically unsaturated comonomer, polymerization can be carried out, for example, by the precipitation method in aprotic apolar media, above all in aliphatic hydrocarbons. Particularly where 2-methoxy sulphonyl propenoic acid methyl ester is used in quantities of from 0.1 to 5 mole percent as the sulphonate-containing comonomer, high levels of incorporation are obtained with butyl hydroperoxide/$SO_2$ at 35°–45° C. in petroleum ether.

One example of solution polymerization is the copolymerization of methyl acrylate/2-sulphopropenoic acid methyl ester in dimethyl sulphoxide which is initiated at 70° C. with 2,2'-azo-bis-isobutyronitrile.

In all the described process, the ester groups in the polymers formed may be completely or partly hydrolyzed in water or in alcohols.

The K-values of the polymers quoted in the Examples were determined at 20° C. in 0.5% dimethyl formamide solution containing 3 g/l of sodium nitrate in accordance with H. Fikentscher, Cellulosechemie 13 (1932), page 58.

The intrinsic viscosities quoted in the Examples were measured at 20° C. in a 0.5% dimethyl formamide solution containing 3 g/l of sodium nitrate in accordance with M. Hoffmann et al., Polymeranalytik I, pages 314 et seq (1977).

Despite their high molecular weights, the polymers are readily soluble and may be processed in particular into filaments, fibres and films, preferably acrylic fibres, characterized by hydrophilic properties, high thermal stability and a high affinity for basic dyes.

Polymers of which the monomer units B consist solely of acrylonitrile show a surprisingly depressed softening point which is otherwise only obtained in comparable polymers by copolymerization with acrylic acid esters.

EXAMPLES (1) Copolymerization of acrylonitrile/2-sulphopropenoic acid methyl ester in aqueous medium (semi-batch feed process)

200 ml of distilled water, 15 g of monomer made up of 99 to 80% by weight of acrylonitrile and 1 to 20% by weight of 2-sulphopropenoic acid methyl ester and 0.5 g of 1-N sulphuric acid were introduced into a reaction vessel. After nitrogen had been passed through and the polymerization mixture tempered at 55° C., polymerization was initiated by the addition of 15 ml of each of the following solutions I and II.

Solution I 100 ml of distilled water
0.5 g of potassium peroxodisulphate

Solution II 100 ml of distilled water
1.5 g of sodium disulphite

The remainders of solutions I and II plus solution III are then simultaneously added over a period of 4 hours

Solution III 85 g of monomer made up of 100 to 80% by weight of acrylonitrile and 0 to 20% by weight of 2-sulphopropenoic acid methyl ester.

On completion of polymerization, the water and unreacted monomer were separated off by filtration. After washing with 3 liters of water and ethanol, followed by drying, a polymer was obtained, the properties of which are set out in Table 1.

(2) Copolymerization of acrylonitrile/sodium-2-sulphopropenoic acid methyl ester in aqueous medium (semi-batch feed process)

160 ml of distilled water, 15 g of monomer made up of 99 to 80% by weight of acrylonitrile and 1 to 20% by weight of sodium-2-sulphopropenoic acid methyl ester and 0.5 g ml of 1-N sulphuric acid were introduced into a reaction vessel. After nitrogen had been passed through and the polymerization mixture tempered at 55° C., polymerization was started by the addition of 10 ml of each of the following solutions I and II.

Solution I 80 ml of distilled water
0.5 g of potassium peroxodisulphate

Solution II 80 ml of distilled water
1.5 g of sodium disulphite
The remainders of solutions I and II plus solutions III and IV were the simultaneously added over a period of 4 hours.

Solution III 80 ml of distilled water
0.85 to 17 g of sodium-2-sulphopropenoic acid methyl ester

Solution IV 84.15 to 68 g of acrylonitrile
Working up was carried out in the same way as in Example 1. The results are shown in Table 1.

(3) Copolymerization of acrylonitrile/2-methoxysulphonyl propenoic acid methyl ester in petroleum ether (semi-batch feed process)

158 ml of petroleum ether (boiling range 40° to 80° C.) and 33.8 g of monomer made up of 99 to 70% by weight of acrylonitrile and 1 to 30% by weight of 2-methoxysulphonyl propenoic acid methyl ester were introduced into a reaction vessel. After nitrogen had been passed through and the reaction mixture tempered at 38° C., polymerization was started by the addition of solutions I and II.

Solution I 30 ml of petroleum ether (boiling range 40° to 80° C.)
7.5 g of acrylonitrile
0.23 g of t-butyl hydroperoxide solution (80% by weight)

Solution II 30 ml of petroleum ether (boiling range 40° to 80° C.)
7.5 g of acrylonitrile
0.65 g of sulphur dioxide
Solutions III, IV and V were then simultaneously added over a period of 5 hours.

Solution III 245 g of monomer made up of 99 to 78% by weight of acrylonitrile and 1 to 22% by weight of 2-methoxysulphonyl propenoic acid methyl ester.

Solution IV 315 ml of petroleum ether (boiling range 40° to 80° C.)
5 g of acrylonitrile
1.27 g of t-butyl hydroperoxide solution (80% by weight)

Solution V 295 ml of petroleum ether (boiling range 40° to 80° C.)
20 g of acrylonitrile
3.61 g of sulphur dioxide On completion of polymerization, the petroleum ether and unreacted monomer were separated off by filtration. After washing with 3 liters of petroleum ether, followed by drying, a polymer was obtained, the properties of which are shown in Table 1.

(4) Copolymerization of acrylonitrile/2-methoxysulphonyl propenoic acid methyl ester in dimethyl formamide solution (batch process)

488 g of diemthyl formamide and 180 g of monomer made up of 99 to 85% by weight of acrylonitrile and 1 to 15% by weight of 2-methoxysulphonyl propenoic acid methyl ester were introduced into a reaction vessel. After nitrogen had been passed through and the reaction mixture tempered at 65° C., polymerization was initiated by the addition of 50 g of dimethyl formamide and 1.8 g of t-butyl perpivalate. After 4 hours, the polymer was precipitated with ethanol, filtered off, washed with ethanol and dried.

The results are shown in Table 1.

(5) Terpolymerization of acrylonitrile/methyl acrylate/2-methoxysulphonyl propenoic acid methyl ester in n-hexane (continuous process)

The following solutions I to V were used for polymerization:

Solution I 2100 g of n-hexane
611 g of acrylonitrile
40.3 g of methyl acrylate
11.2 g of 2-methoxysulphonyl propenoic acid methyl ester
1.8 g of trichloroacetic acid
3.6 g of t-butyl hydroperoxide

Solution II 130 g of n-hexane
79.5 g of acrylonitrile
5.2 g of methyl acrylate
10.8 g of sulphur dioxide.

Solution III 5386.5 g of n-hexane
972 g of acrylonitrile
137.3 g of methyl acrylate
8.0 g of trichloroacetic acid
58.5 g of sulphur dioxide

Solution IV 5386.5 g of n-hexane
972 g of acrylonitrile
137.3 g of methyl acrylate
19.5 g of t-butyl hydroperoxide

Solution V 2599 g of n-hexane
2213 g of acrylonitrile
67.5 g of 2-methoxysulphonyl propenoic acid methyl ester Solution I was introduced under nitrogen into a reaction vessel equipped with a gate paddle stirrer and with an overflow pipe connected to the bottom outlet and tempered at 38° C.

This temperature of 38° C. was maintained throughout the reaction. Polymerization was started by the addition of solution II at a stirring speed of 80 r.p.m. Solutions III, IV and V were then added as follows:
solution III 1060 ml/hour
solution IV 1060 ml/hour
solution V 750 ml/hour In the following continuous operation, polymer dispersion was continuously discharged in a quantity corresponding to the solutions introduced (approximately 2 kg/hour).

After 4 hours' polymerization, a stationary state was reached in regard to conversion, polymer composition and average molecular weight. The polymer dispersion was worked up in the same way as in Example 3. The results are shown in Table 1.

solution were then added to the resulting solution. The solution was further diluted with 1 liter of water. 2.4 g of the drawn fibres were heated under reflux for 1.5 hours in the solution thus prepared. The dyed fibres were removed, rinsed, thoroughly boiled three times with 2 liters of distilled water and dried. The dried, dyed fibres were dissolved in dimethyl formamide and the quantity of dye was determined in the usual way by extinction measurement.

TABLE 1

Results of Examples 1 to 6

| Examples | | Input of acrylonitrile/ comonomer (% by weight) | Conversion (%) | K-value | Acrylonitrile/comonomer content in the polymer | |
|---|---|---|---|---|---|---|
| | | | | | (% by weight) | (Mole percent) |
| (1) | Copolymerization of acrylonitrile/ 2-sulphopropenoic acid methyl ester in aqueous medium | 99.0/1.0 | 90 | 87.6 | 99.7/0.3 | 99.9/0.1 |
| | | 98.0/2.0 | 90 | 99 | 99.2/0.8 | |
| | | 96.0/4.0 | 90 | 108 | 98.5/1.5 | |
| | | 88.0/12.0 | 65 | 110 | 96.0/4.0 | |
| | | 80.0/20.0 | 51 | 125 | 94.2/5.8 | 98.1/1.9 |
| (2) | Copolymerization of acrylonitrile/ sodium-2-sulphopropenoic acid methyl ester in aqueous medium | 99.0/1.0 | 93 | 93.9 | 99.6/0.4 | 99.9/0.1 |
| | | 98.0/2.0 | 92 | 96.7 | 96.6/0.4 | |
| | | 96.0/4.0 | 87 | 96.1 | 98.7/1.3 | |
| | | 88.0/12.0 | 81 | 106 | 95.2/4.8 | |
| | | 80.0/20.0 | 70 | 105 | 91.8/8.2 | 97.5/2.5 |
| (3) | Copolymerization of acrylonitrile/ 2-methoxysulphonyl propenoic acid methyl ester in petroleum ether | 99.0/1.0 | 70 | 90.0 | 97.1/2.9 | 99.1/0.9 |
| | | 97.0/3.0 | 72 | 84.6 | 95.8/4.2 | |
| | | 94.0/6.0 | 71 | 79.6 | 90.4/9.6 | |
| | | 88.0/12.0 | 47 | 68.3 | 76.5/23.5 | |
| | | 80.0/20.0 | 43 | 61.5 | 74.0/26.0 | 90.6/9.4 |
| (4) | Copolymerization of acrylonitrile/ 2-methoxysulphonyl propenoic acid methyl ester in DMF | 99.0/1.0 | 76 | 50.4 | 98.9/1.1 | 99.7/0.3 |
| | | 97.0/3.0 | 68 | 48.7 | 96.2/3.8 | |
| | | 92.5/7.5 | 60 | 45.6 | 91.8/8.2 | |
| | | 85.0/15.0 | 31 | 44.2 | 82.9/17.1 | 94.3/5.7 |
| (5) | Terpolymerization of acrylonitrile/methyl acrylate/2-methoxysulphonyl propenoic acid methyl ester in hexane | 92.4/6.1/1.5 | 60 | 86 | 93.5/4.0/2.5 | 96.7/2.5/0.8 |
| (6) | Copolymerization of acrylonitrile/ methyl acrylate/sodium methallyl sulphonate in aqueous medium (comparison) | 93.6/5.6/0.8 | 95 | 80 | 93.9/5.6/0.5 | 96.3/3.5/0.2 |

(7) Acrylonitrile/2-methoxysulphonyl propenoic acid methyl ester fibres

A copolymer produced in accordance with Example 3 from 97% by weight of acrylonitrile and 3% by weight of 2-methoxysulphonyl propenoic acid methyl ester (K-value 80) was dry-spun from a dimethyl formamide solution through a 36-bore jet (jet bore diameter 0.2 mm).

Solids content (spinning solution) : 28% by weight
Viscosity : 300 Pas (20° C.)
Duct temperature : 200° C.
Air volume : 32 m³/h
Air temperature : 250° C.
Spinning head temperature : 80° C.
Take-off speed : 250 m/minute The spun filaments had a denier of 10 dtex. Pairs of spun filaments were combined to form a tow having a denier of 720 f 72.

The tow was drawn in a ratio of 1:4 in boiling water and washed twice at 95° C. (total permitted shrinkage 18%).

The drawn tow obtained was fixed in the form of strands (5 minutes in an autoclave at 125° C.). The final denier amounted to 300 dtex.

Dyeing Example 1 g of the Colour Index Dye C. I. Basic Red 18 (11085) was dissolved in 1 liter of hot distilled water. 1 ml of 3% acetic acid and 1 ml of 4% sodium acetate The dye absorption amounted to 15.5% by weight, based on the weight of the fibres.

EXAMPLE 8

Copolymerization of methacrylic acid methyl ester/2-methoxysulphonyl propenoic acid methyl ester in solution The following components were polymerized at 70° C. in a stirrer-equipped reactor in the presence of benzene as solution promoter:

| | (A) | (B) | (C) | (D) | |
|---|---|---|---|---|---|
| Methyl methacrylate | 18 | 16 | 16.8 | 16 | (g) |
| 2-methoxysulphonyl propenoic acid methyl ester | 2 | 4 | 11.2 | 16 | (g) |
| 2-methoxysulphonyl propenoic acid methyl ester | 6 | 12 | 27 | 36 | (mole %) |
| 2,2'-azo-bis-isobutyronitrile | 0.16 | 0.15 | 0.19 | 0.21 | (g) |
| Benzene | 20 | 20 | 12 | 8 | (g) |

After 1 hour, the polymerization reaction was stopped by rapid cooling and by the addition of 40 g of methylene chloride. The copolymers formed were isolated and purified by repeated dissolution in and reprecipitation from dilute methylene chloride solution to which ether had been added as precipitant. The polymers had the following properties:

| | (A) | (B) | (C) | (D) | |
|---|---|---|---|---|---|
| Polymer composition: | | | | | |
| Methyl methacrylate | 84.5 | 75.8 | 52.5 | 45.5 | (% by weight) |
| 2-methoxysulphonyl propenoic acid methyl ester | 14.6 | 24.2 | 47.5 | 54.5 | (% by weight) |
| 2-methoxysulphonyl propenoic acid methyl ester | 8.8 | 15.1 | 33.5 | 40.0 | (mole %) |
| Intrinsic viscosity: $[\eta]$ | 1.44 | 1.03 | 0.48 | 0.26 | (dl/g) |
| Conversion (% by weight) | 65 | 76 | 71 | 66 | |

EXAMPLE 9

Copolymerization of methyl acrylate/2-sulphopropenoic acid methyl ester in solution The following components were polymerized in 50% dimethyl sulphoxide solution at 70° C. in a stirrer-equipped reactor:

| | (A) | (B) | (C) | (D) | |
|---|---|---|---|---|---|
| Methyl acrylate | 19 | 18 | 16 | 12 | (g) |
| 2-sulphopropenoic acid methyl ester | 1 | 2 | 4 | 8 | (g) |
| 2-sulphopropenoic acid methyl ester | 3 | 5 | 11 | 26 | (mole %) |
| 2,2'-azo-bis-isobutyronitrile | 0.2 | 0.2 | 0.2 | 0.2 | (g) |

After 30 minutes, the polymerization reaction was stopped by rapid cooling and by the addition of 20 g of methylene chloride. The copolymers were isolated and purified by repeated dissolution in and reprecipitation from dilute methylene chloride solution to which diethyl ether/ethanol had been added as precipitant. The polymers having the following properties:

| | (A) | (B) | (C) | (D) | |
|---|---|---|---|---|---|
| Polymer composition: | | | | | |
| Methyl acrylate | 91.9 | 86.6 | 76.1 | 50.4 | (% by weight) |
| 2-sulphopropenoic acid methyl ester | 8.1 | 13.4 | 23.9 | 49.6 | (% by weight) |
| 2-sulphopropenoic acid methyl ester | 4.4 | 7.4 | 14.0 | 33.8 | (mole %) |
| Intrinsic viscosity: $[\eta]$ | 0.58 | 0.35 | 0.65 | 0.55 | (dl/g) |
| Conversion (% by weight) | 46 | 43 | 52.5 | 42 | |

The chemical composition of the polymers was determined from the sulphur and methoxy group contents as measured by elemental analysis. It was foumd that, in the course of working up, the polymer-fixed sulphonic acid ester groups undergo hydrolysis to sulphonic acid groups.

EXAMPLE 10

Mass copolymerization of styrene/2-methoxysulphonyl propenoic acid methyl ester

The following components were polymerized in a kneader:

| | (A) | (B) | (C) | (D) | |
|---|---|---|---|---|---|
| Styrene | 19 | 18 | 16 | 10 | (g) |
| 2-methoxysulphonyl propenoic acid methyl ester | 1 | 2 | 4 | 10 | (g) |
| 2-methoxysulphonyl propenoic acid methyl ester | 3 | 6 | 13 | 37 | (mole %) |
| 2,2'-azo-bis-isobutyronitrile | 0.2 | 0.2 | 0.18 | 0.16 | (g) |
| Reaction temperature | 80 | 80 | 80 | 70 | (°C.) |
| Reaction time | 3.0 | 3.0 | 1.0 | 0.5 | (h) |

The copolymers were isolated and purified by repeated dissolution in and reprecipitation from dilute methylene chloride solutions to which diethyl ether or diethyl ether/hexane had been added as precipitant. The polymers have the following properties:

| | (A) | (B) | (C) | (D) | |
|---|---|---|---|---|---|
| Polymer composition: | | | | | |
| Styrene | 93.8 | 88.6 | 64 | 48 | (% by weight) |
| 2-methoxysulphonyl propenoic acid methyl ester | 6.2 | 11.4 | 36 | 52 | (% by weight) |
| 2-methoxysulphonyl propenoic acid methyl ester | 3.7 | 7.0 | 25 | 39 | (mole %) |
| Intrinsic viscosity: $[\eta]$ | 0.165 | 0.15 | 0.1 | 0.135 | (dl/g) |
| Conversion (% by weight) | 79.5 | 73.5 | 68.8 | 68.9 | |

EXAMPLE 11

Mass copolymerization of vinyl acetate/2-methoxysulphonyl propenoic acid methyl ester The following components were introduced into a reactor equipped with a stirrer and kneader: 80 g of vinyl acetate, 20 g of 2-methoxysulphonyl propenoic acid methyl ester (11 mole percent) and 0.8 g of 2,2'-azo-bis-isobutyronitrile.

After tempering at 65° C. and an increase in the viscosity of the mixture, a solution of 80 g of vinyl acetate, 20 g of 2-methoxysulphonyl propenoic acid methyl ester (11 mole percent) and 0.4 g of 2,2'-azo-bis-isobutyronitrile was added over a period of 1 hour.

Polymerization was continued until the initially clear reaction mixture became distinctly cloudy. The polymer was isolated by repeated dissolution in methylene chloride and precipitation with ether.

Yield: 82 g (41%)

Composition: 42% by weight of 2-methoxysulphonyl propenoic acid methyl ester (26 mole percent) 57% by weight of vinyl acetate Intrinsic viscosity: $[\eta]$ 0.48 dl/g.

We claim:

1. A polymer comprising:
   (A) 0.1 to 80 mole percent of polymerized units corresponding to the following formula

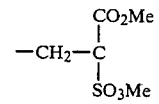

and, (B) 20 to 99 mole percent of polymerized units of 1 or more comonomer corresponding to the formula

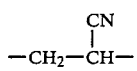

said polymer selected from the group consisting of
(1) from 89 to 99.9 mole percent of acrylonitrile and from 0.1 to 11 mole percent of 2-methoxysulphonyl propenoic acid methyl ester,
(2) from 90 to 99.8 mole percent of acrylonitrile, from 0.1 to 6 mole percent of methyl acrylate and from 0.1 to 4 mole percent of 2-methoxysulphonyl propenoic acid methyl ester and,
(3) from 40 to 89.9 mole percent of acrylonitrile, from 0.1 to 15 mole percent of 2-methoxysulphonyl propenoic acid methyl ester and from 10 to 59.9 mole percent of vinyl chloride or vinylidene chloride.

2. A polymer according to claim 1 consisting of 89 to 99.9 mole percent of acrylonitrile and 0.1 to 11 mole percent of 2-methoxysulphonyl propenoic acid methyl ester.

3. A polymer according to claim 1 consisting of 90 to 99.8 mole percent of acrylonitrile, 0.1 to 6 mole percent of methyl acrylate and 0.1 to 4 mole percent of 2-methoxysulphonyl propenoic acid methyl ester.

4. A polymer according to claim 1 consisting of 40 to 89.9 mole percent of acrylonitrile, 0.1 to 15 mole percent of 2-methoxysulphonyl propenoic acid methyl ester and 10 to 59.9 mole percent of vinyl chloride or vinylidine chloride.

* * * * *